March 22, 1927.

C. STEENSTRUP

ARTIFICIAL FISH BAIT

Filed July 20, 1926

1,622,063

Inventor:
Christian Steenstrup
by Alfred V. Bobor
His Attorney.

Patented Mar. 22, 1927.

1,622,063

UNITED STATES PATENT OFFICE.

CHRISTIAN STEENSTRUP, OF SCHENECTADY, NEW YORK.

ARTIFICIAL FISH BAIT.

Application filed July 20, 1926. Serial No. 123,648.

The present application is a continuation in part of my application Serial No. 40,710, filed July 1, 1925.

The invention relates to artificial fish baits and especially to artificial fish baits of the plug type.

The object of the invention is to provide an improved fish bait of the plug type which embodies as a part of its structure a member which as the plug is pulled through the water will take on back and forth sidewise motion in simulation of the movements of the tail or fin of a fish. Such member or members embody preferably as a part of their structure one or more fish hooks but they need not do so necessarily.

For a consideration of what I believe to be novel and my invention, attention is directed to the following description and the claims appended thereto.

Figure 1:
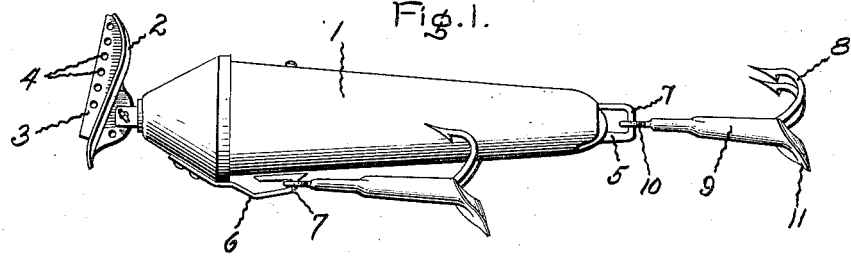
Figure 2:
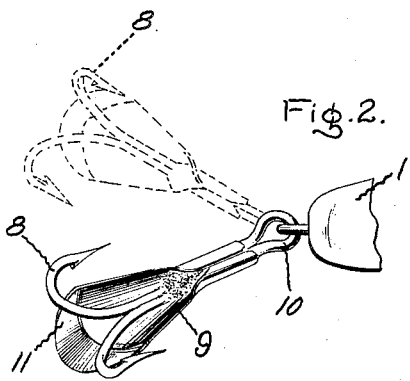
Figure 3:
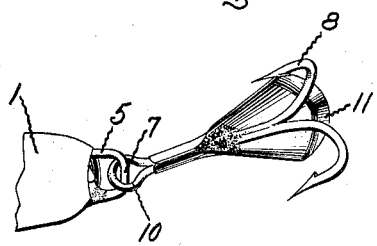
Figure 5:
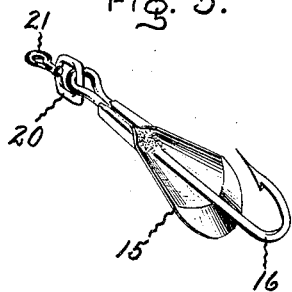
Figure 4:
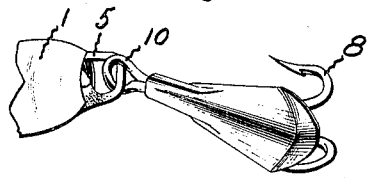
Figure 6:
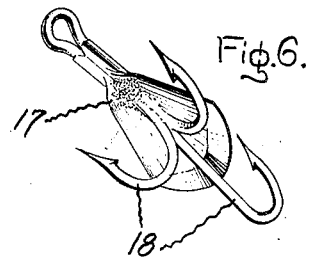
Figure 7:
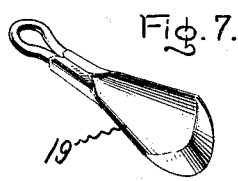

In the drawing, Fig. 1 is a side view of an artificial fish bait embodying the invention; Fig. 2 is a top plan view of the end of the plug shown in Fig. 1 illustrating the two positions which the fish hook structure at the end of the plug assumes at the two extremes of its sidewise movements, one position being shown in full lines and the other position being shown in dotted lines; Fig. 3 is a side view of the end of the plug showing the fish hook structure in one position; Fig. 4 is a view similar to Fig. 3 showing the fish hook structure in the other extreme position; Fig. 5 is a perspective view of a modification, and Figs. 6 and 7 are perspective views of further modifications.

Referring to the drawing, 1 indicates a plug body of suitable structure, a plug body of the type forming the subject matter of my parent application referred to above being shown in the present instance. It is provided at its forward end with a scoop shaped plate 2 as disclosed in my parent application which carries a plate 3 having eyes 4 to which a fish line may be attached. At the rear end of the plug body is a hook attaching eye 5 and at its forward end is a hook attaching eye 6. These eyes are comparatively large, being substantially larger than those provided ordinarily for attaching a hook structure to a plug body. They are provided each with a comparatively straight end wall 7.

Each fish hook structure comprises one or a plurality of hooks 8 attached to a plate 9 in the forward end of which is located an eye 10. Plate 9 is curved upwardly and increases in width from its forward end to its rear end, being somewhat triangular in shape. At its rear end it is curved downwardly and inwardly as is indicated at 11 to form a sort of shallow scoop in which the water may catch. This scoop performs an important function in that it causes the fish hook structure to weave sidewise back and forth when the plug is pulled through the water. Eye 10 is made quite large as compared with the eyes met with usually in this class of apparatus, and since attaching hooks or eyes 5 and 6 are made comparatively large, there is provided between the fish hook structure and the plug a connection which is quite loose thus giving freedom for movement of the fish hook structure relatively to the plug body. When the plug is being pulled through the water, the plate 9 rides flat on the water with the hooks pointing in an upward direction, and I have found that with this construction and arrangement the fish hook structure will weave sidewise back and forth after the manner illustrated in Fig. 2, the structure moving back and forth from the full line position to the dotted line position. The two extreme positions are shown in Figs. 3 and 4 also. The back and forth movement is quite rapid, the rapidity depending on the speed with which the plug is pulled through the water. This action I now believe to be caused as follows: If the fish hook structure is straight with the plug body and riding flat in the water, some unevenness of the action of the water on the scoop will throw the fish hook structure sidewise and it will continue to move sidewise until such time as the eye catches on the edge of the eye on the plug body. This will arrest further direct sidewise movement but will impart a turning movement to the fish hook structure until the eye of the fish hook structure binds against the eye on the plug body, the turning movement being on the longitudinal axis of the structure. When this turning takes place, the water will escape from the upper edge of the scoop and there will be caused a force which will start the hook structure moving in the other direction. The movement being started, it will not cease again until the structure has swung to the extreme opposite position. This back and forth movement will continue thus, giving to the structure the appearance of the movements of the tail or the fin of a fish.

In a way, the motion imparted to the fish hook when the plug is pulled through the water is a sort of sidewise swinging movement back and forth, and in order to obtain this movement to good advantage it is desirable as is pointed out above to have large eyes on the plug and hook structure so as to permit of freedom of movement. In this connection I have found it to be of advantage to make the end wall of one eye, for example the eye on the plug body, straight as shown because this permits of a greater turning action with the same size of eye than would be the case were the eye round. The manner in which the fish hook structure turns and the manner in which the eye on the fish hook structure binds in the eye on the plug is shown particularly in Figs. 3 and 4. As will be seen, the movement of the fish hook structure sidewise is stopped by the eye on the fish hook structure turning and binding against the eye on the plug body.

The hooks may be attached to the scooped shaped plate in any suitable manner and any desired number of hooks may be used. And I may if found desirable provide the scooped shaped plate without any hooks. In Fig. 5 I have shown the scooped shaped plate 15 provided with a single hook 16 and in Fig. 6 I have shown the scoop shaped plate 17 provided with three hooks 18. In Fig. 7 the scoop shaped plate 19 is shown alone without any hooks attached to it.

If the fish hook structure is to be used with a plug body having the ordinary small eye, I may provide on the structure a special large eye 20 to which is attached a smaller eye 21 adapted to be connected to the eye on the plug body. This is illustrated in Fig. 5. By this means I am enabled to obtain the advantages of my invention in connection with an ordinary plug body and without replacing the eye already provided on the plug body.

In connection with a structure as is shown in Fig. 1, I may for example, utilize a scoop plate having hooks on it in connection with the attaching eye 6 and then utilize a scoop plate without hooks as shown in Fig. 7 in connection with attaching eye 5. Also, the scoop plates and the hooks may be given any desired color to make them harmonize with the color or colors of the plug body and to make them attractive as a bait.

What I claim as new and desire to secure by Letters Patent of the United States, is:—

1. The combination with a plug body having an attaching eye of comparatively large size, of a member having an eye of comparatively large size which engages said attaching eye, said member comprising a triangular shaped plate having its wide end bent downwardly and curved to form a shallow scoop.

2. The combination with a plug body having an attaching eye of comparatively large size, of a fish hook structure having an eye of comparatively large size which engages said attaching eye, said structure comprising a triangular shaped plate having its wide end bent downwardly and curved to form a shallow scoop, and one or more fish hooks attached to said plate.

3. A bait structure comprising a plate having an attaching eye at one end, the other end being bent downwardly to form a shallow scoop.

4. A bait structure comprising a triangular shaped plate having an attaching eye at its forward end, the rear end being curved downwardly to form a shallow scoop on the under side of the plate.

5. A bait structure comprising a triangular shaped plate having an eye at its smaller end, the central portion of said plate being curved upwardly and its wider end being curved downwardly to form a shallow scoop.

6. A fish hook structure comprising a plate having an attaching eye at its forward end, the other end being bent downwardly to form a shallow scoop, and one or more fish hooks attached to said plate.

7. A fish hook structure comprising a triangular shaped plate having an eye at its smaller end, the wider end being curved downwardly to form a shallow scoop, and one or more fish hooks attached to said plate.

8. A fish hook structure comprising an upwardly curved triangular shaped plate having an eye at its smaller end, the wider end being curved downwardly to form a shallow scoop, and one or more fish hooks attached to said plate.

9. The combination with a plug body, of a fish hook structure attached thereto by means which provides a comparatively loose connection, said fish hook structure comprising a plate which at its free end is bent downwardly to form a scoop and one or more fish hooks attached to said plate.

In witness whereof, I have hereunto set my hand this 15th day of July, 1926.

CHRISTIAN STEENSTRUP.